United States Patent [19]
Chang

[11] Patent Number: 5,419,674
[45] Date of Patent: May 30, 1995

[54] SEMI-ACTIVE COMPLIANCE DEVICE

[75] Inventor: Sun-Lai Chang, Hyattsville, Md.

[73] Assignee: United Parcel Service of America, Inc., Atlanta, Ga.

[21] Appl. No.: 23,580

[22] Filed: Mar. 1, 1993

[51] Int. Cl.$^6$ .......................................... B65G 35/00
[52] U.S. Cl. ...................... 414/751; 901/29; 901/45; 74/490.06; 74/490.09
[58] Field of Search ............... 414/729, 749, 753, 917; 901/29, 32–35, 45; 33/23.1, 23.03, 25.5; 191/65, 67; 74/479 BW, 479 PP, 479 PH, 479 PF, 479 P, 471 XY

[56] References Cited

U.S. PATENT DOCUMENTS

| 888,339 | 5/1908 | Macloskie | 191/65 |
|---|---|---|---|
| 4,439,926 | 4/1984 | Whitney et al. | 33/185 R |
| 4,477,975 | 10/1984 | De Fazio et al. | 33/169 C |
| 4,537,557 | 8/1985 | Whitney | 901/45 X |
| 4,848,757 | 7/1989 | De Fazio | 267/150 |

FOREIGN PATENT DOCUMENTS

| 1038219 | 8/1983 | U.S.S.R. | 414/917 |
|---|---|---|---|
| 1207754 | 1/1986 | U.S.S.R. | 417/749 |
| 1278201 | 12/1986 | U.S.S.R. | 414/749 |

OTHER PUBLICATIONS

Research and Development of Selective Compliance Assembly Robot Arm (1st Report) —Characteristics of the System-, Nobuyuki Furuya and Hiroshi Makino, Journal of the Japanese Society of Precision Engineering (Japan), vol. 46, No. 12, (Dec. 1980), pp. 1525–1531.

Primary Examiner—Donald W. Underwood
Attorney, Agent, or Firm—Steve Mendelsohn; William H. Murray

[57] ABSTRACT

A semi-active compliance device forms part of a robot used to stack packages. The semi-active compliance device has an X-Y motion mechanism and a remote center compliance mechanism. The X-Y motion mechanism provides active open-loop control of the forces of a package along the X and Y axes so that the X- and Y-axis positions of the package will be passively controlled by the environment (e.g., walls and/or adjacent stacks of packages). The X-Y motion mechanism has two linear actuators and two pantographs. The remote center compliance mechanism provides passive orientation of the package about the Z axis. The semi-active compliance device also has a mechanism to return the remote center compliance mechanism to a home position.

12 Claims, 3 Drawing Sheets

SEMI-ACTIVE COMPLIANCE DEVICE

BACKGROUND OF THE INVENTION

1. Field of the Invention

The present invention relates to robotics, and, in particular, to a semi-active compliance device for controlling the position, force, and orientation of a package.

2. Statement of Related Art

In the field of package shipping, it is desirable to use robots to stack packages one on top of another for shipment. A package-stacking robot must be able to grab a package, lift it, move it to a desired position, and place it upon a stack in a desired orientation. Such a robot must be strong enough to lift and move a heavy package. Such a robot must also be gentle enough to place such a heavy package on a stack without knocking over any of the existing stacks or damaging any of the packages.

In addition, the nesting of packages in stacks should be compact to utilize space efficiently and to provide stable stacks. Errors in detecting and/or determining the position of the stack and inaccuracies in the positioning of the package by the robot will cause package nesting problems. One way to control the position and/or orientation of a package and the force and/or moment with which the package is moved when placing the package upon a stack is to use a robot with force sensors under force control. These force sensors generate signals representative of the magnitude and direction of external forces exerted onto the package, such as those that occur when the package bumps into a wall or another package. These force-sensor signals can be used for closed-loop force control of the motion of the package. The technology of force control requires very sophisticated force sensors and relatively complicated calculations which, in turn, reduces system speed and incurs high cost. To reduce the cost and improve system speed, remote center compliance (RCC) devices are conventionally used.

FIGS. 1 and 2 depict two different situations in which a robot (not shown) must adjust the orientation of a package 100 for proper placement upon a stack. In FIG. 1, package 100 must be rotated clockwise to be aligned with walls 102 and 104, while, in FIG. 2, package 100 must be rotated counter-clockwise to be properly oriented. As shown in FIG. 1, when the robot drives package 100 into wall 102, wall 102 exerts force $F_r$ in the positive X direction at corner 106 of package 100. As shown in FIG. 2, when the robot drives package 100 into wall 102, wall 102 exerts force $F_r$ in the positive X direction at corner 108 of package 100. When the force sensors (not shown) are located in the robot, the control algorithm cannot distinguish between the two situations depicted in FIGS. 1 and 2.

In applications other than package stacking, the problem depicted in FIGS. 1 and 2 may be handled by using a conventional remote center compliance (RCC) device such as those disclosed in U.S. Pat. Nos. 4,439,926 (Whitney et al.), 4,477,975 (De Fazio et al.), and 4,848,757 (De Fazio). These conventional RCC devices, however, are not well suited for package-stacking in the field of package shipping. The application of these conventional RCC devices is limited to small motion adjustment and insertion assemblies such as peg-hole devices. Moreover, since these conventional RCC devices are flexible, there will be unpredictability in controlling the remote center of heavy packages. This flexibility will also decrease the natural frequency of the robot system, making accurate control difficult.

SUMMARY OF THE INVENTION

In a preferred embodiment, the present invention is a semi-active compliance device that is attachable to a base. According to this preferred embodiment, has two linear actuators and two pantograph mechanisms. A first linear actuator has a first actuator input rigidly fixed to the base and a first actuator output aligned along a first axis. A second linear actuator has a second actuator input rigidly fixed to the base and a second actuator output aligned along a second axis, where the first axis is substantially perpendicular to the second axis. A first pantograph mechanism, substantially co-planar to the first and second axes, is pivotally connected to the first actuator output at a first point of the first pantograph mechanism. The first pantograph mechanism is also pivotally connected to the second actuator output at a second point of the first pantograph mechanism. A second pantograph mechanism, substantially co-planar to the first and second axes, is pivotally connected to the first actuator output at a first point of the second pantograph mechanism. The second pantograph mechanism is also pivotally connected to the second actuator output at a second point of the second pantograph mechanism.

In an alternative preferred embodiment, the present invention is a semi-active compliance device that is attachable to a first base. The device may be used to control the orientation of a package held by a gripper. According to this preferred embodiment, the device has two rigid links. A first rigid link is pivotally connected at a first end to the first base and pivotally connected at a second end to the gripper. A second rigid link is substantially co-planar to the first rigid link. The second rigid link is pivotally connected at a first end to the first base and pivotally connected at a second end to the gripper. The distance between the first end of the first rigid link and the first end of the second rigid link is greater than the distance between the second end of the first rigid link and the second end of the second link.

DETAILED DESCRIPTION OF THE INVENTION

The present invention is a semi-active compliance (SAC) device that can be used to control the position, force, and orientation of a package during a package-stacking operation. The SAC device contains an X-Y motion mechanism for actively controlling the fine position and force of a package in two orthogonal directions (e.g., X and Y axes). The SAC device also contains a remote center compliance (RCC) mechanism for passively controlling the orientation of the package about a third orthogonal direction (e.g., Z axis). In a preferred embodiment, the SAC device of the present invention forms one part of an overall robot system, where the base of the SAC device is attached to a mechanical appendage that controls the crude position and orientation of the package and the output of the SAC device is attached to a gripper that grips the package.

X-Y Motion Mechanism

Figure 3:
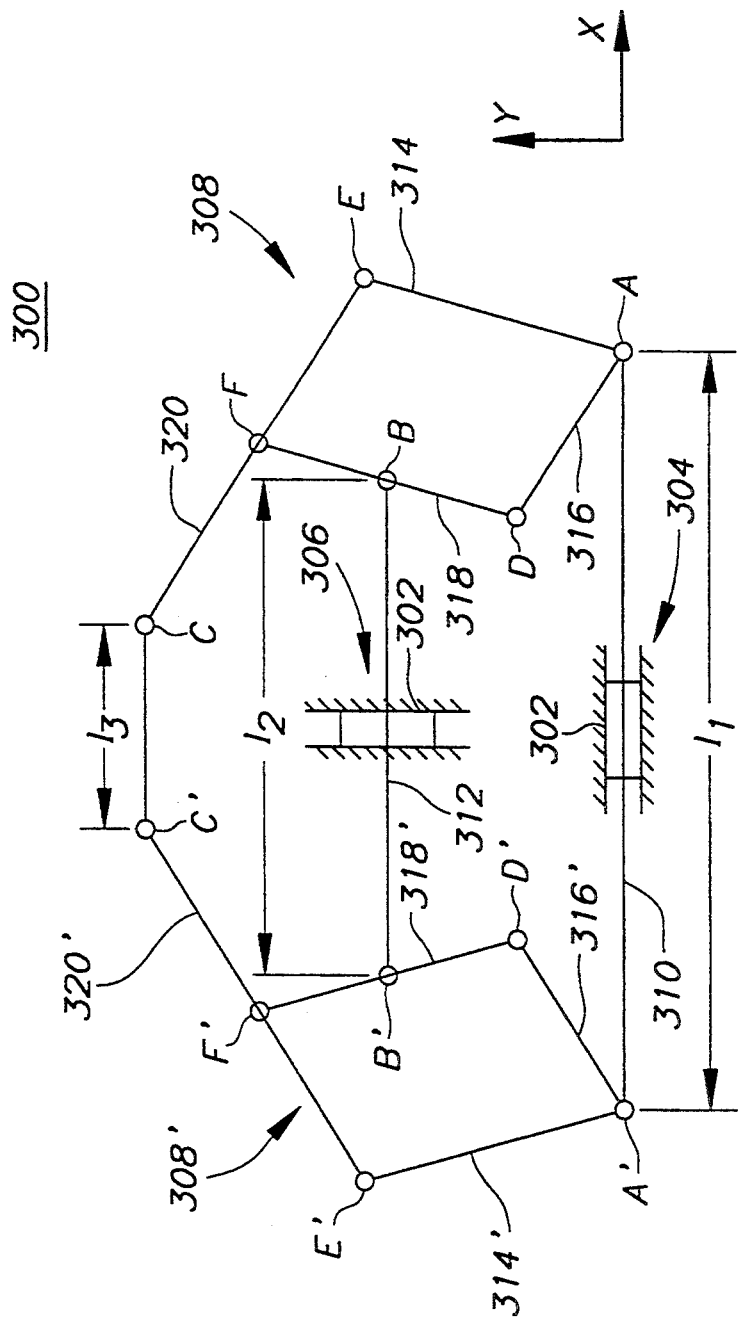
FIG. 3 is a topographical representation of an X-Y motion mechanism of a semi-active compliance device according to a preferred embodiment of the present invention.

Referring now to FIG. 3, there is shown a topographical representation of an X-Y motion mechanism 300 that forms part of an SAC device according to a preferred embodiment of the present invention. Mechanism 300 can be used to control the fine X- and Y-axis positions and forces in a robot system designed to stack packages. Mechanism 300 is connected at its input to a base 302. Base 302 may be the output of another mechanical subsystem (not shown) of the overall robot system.

The output of mechanism 300 may be connected to the input of yet another mechanical subsystem (not shown) of the overall robot system. In a preferred embodiment, the output of mechanism 300 is attached to the input of a remote center compliance device that forms part of the present invention. A preferred embodiment of the remote center compliance device of the present invention is described in further detail later in this specification in conjunction with FIG. 4.

X-Y motion mechanism 300 includes two linear actuators 304 and 306 and two pantograph mechanisms 308 and 308'. The inputs of both linear actuators 304 and 306 are part of the input of mechanism 300 and are rigidly fixed to base 302. The output 310 of actuator 304 is a rigid link aligned with the X-axis and the output 312 of actuator 306 is a rigid link aligned with the Y-axis, as depicted in FIG. 3. Actuator 304 drives output 310 in the positive or negative X-axis direction relative to the input of actuator 304. Similarly, actuator 306 drives output 312 in the positive or negative Y-axis direction relative to the input of actuator 306. Outputs 310 and 312 are preferably parallel to one another and the same length (i.e., l1=l2). Linear actuators 304 and 306 are preferably prismatic joints. In the preferred embodiment of FIG. 3, each prismatic joint is represented by a block fixed to a base.

Panto-graph mechanism 308 includes links 314, 316, 318, and 320. One end of link 314 is pivotally connected at point A to one end of link 316 and to one end of output 310 of X-axis actuator 304. The other end of link 314 is pivotally connected at point E to one end of link 320. The other end of link 316 is pivotally connected at point D to one end of link 318. The other end of link 318 is pivotally connected at point F along the interior of link 320. The other end of link 320 at point C forms part of the output of mechanism 300. Link 318 is also pivotally attached at point B to one end of output 312 of Y-axis actuator 306 along the interior of link 318.

Similarly, pantograph mechanism 308', is symmetric to pantograph mechanism 308 and includes links 314', 316', 318', and 320'. One end of link 314' is pivotally connected at point A' to one end of link 316' and to the other end of output 310 of X-axis actuator 304. The other end of link 314' is pivotally connected at point E' to one end of link 320'. The other end of link 316' is pivotally connected at point D' to one end of link 318'.

The other end of link 318' is pivotally connected at point F' along the interior of link 320'. The other end of link 320' at point C' forms another part of the output of mechanism 300. Link 318' is also pivotally attached at point B' to the other end of output 312 of Y-axis actuator 306 along the interior of link 318'.

When X-axis actuator 304 drives output 310 in the positive (negative) X-axis direction as depicted in FIG. 3, the output of mechanism 300 (defined by points C and C' ) moves in the negative (positive) X-axis direction, without affecting the Y-axis direction of output 310. When Y-axis actuator 306 drives output 312 in the positive (negative) Y-direction, the output of mechanism 300 moves only in the positive (negative) Y-axis direction. Thus, X- and Y-axis actuators 304 and 306 can be used independently to control the X- and Y-axis forces and the X- and Y-axis positions of a package, respectively.

In a preferred embodiment, the lengths of links 314, 318, 314', and 318' are all equal. In addition, the lengths of links 316 and 316' are equal to one another and to the distances between points E and F and between points E' and F'. In this preferred embodiment, the X-axis position $x_c$ at the output of mechanism 300 can be determined from the X-axis position at the input of mechanism 300 (i.e., the X-axis position $x_A$ of output 310 of actuator 304) using Equation (1) below:

$$x_C = -\frac{r}{q} x_A, \quad (1)$$

where r is the distance between points F and C (and between points F' and C') and q is the distance between points E and F (and between points E' and F' and the lengths of links 316 and 316').

Similarly, the Y-axis position $y_c$, X-axis force $F_x$, and Y-axis force $F_y$ can be determined from the Y-axis position at the input of mechanism 300 (i.e., the Y-axis position $Y_B$ of output of actuator 306), the X-axis force $F_A$ of output 310, and the Y-axis force $F_B$ of output 312 using Equations (2), (3), and (4) below, respectively:

$$y_C = \left(1 + \frac{r}{q}\right) y_B \quad (2)$$

$$F_x = -\frac{q}{r} F_A \quad (3)$$

$$F_y = \frac{q}{q+r} F_B \quad (4)$$

Since the positions and forces at the output of mechanism 300 can be determined based on the positions and forces at the input of mechanism 300, mechanism 300 can be controlled open loop with pre-determined allowable forces.

Another property of X-Y motion mechanism 300 is that the distance between points C and C' remains constant and the line defined by points C and C' remains parallel to outputs 310 and 312 for all positions. As such, there is no topographical requirement for a link joining points C and C' although one may be desired for structural reasons. In a preferred embodiment, the distance between points C and C' is equal to the lengths of actuator outputs 310 and 312 (i.e., l1=l2=l3).

Remote Center Compliance Mechanism

Figure 4:
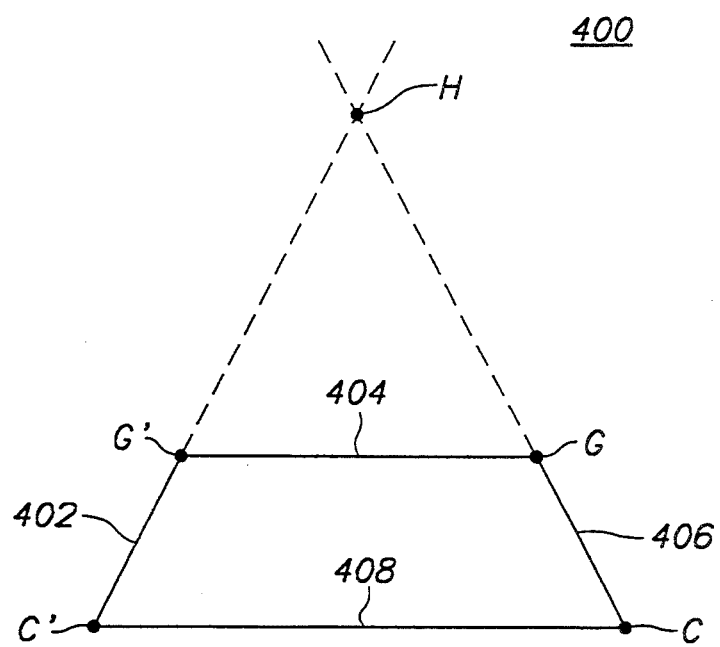
FIG. 4 is a topographical representation of a remote center compliance mechanism of a semi-active compliance device according to a preferred embodiment of the present invention.

Referring now to FIG. 4, there is shown a topographical representation of a remote center compliance (RCC) mechanism 400 that forms part of an SAC device according to a preferred embodiment of the present invention. RCC mechanism 400 can be used in a robot system to orient packages for stacking. In a preferred embodiment, the input of RCC mechanism 400 is connected to the output of X-Y motion mechanism 300 of FIG. 3 and the output of RCC mechanism 400 is connected to the input of a gripper (not shown) that grips a package.

In a preferred embodiment, RCC mechanism 400 includes four rigid links 402, 404, 406, and 408. One end of link 402 is loosely pivotally connected at point C' to one end of link 408. The other end of link 402 is loosely pivotally connected at point G' to one end of link 404. The other end of link 404 is loosely pivotally connected at point G to one end of link 406. The other end of link 406 is loosely pivotally connected at point C to the other end of link 408. Link 408 forms the input of RCC mechanism 400 and link 404 forms the output of RCC mechanism 400. The lengths of links 402 and 406 are preferably equal to one another.

In a preferred embodiment, the input of RCC mechanism 400 (i.e., link 408) is rigidly connected to the output of X-Y motion mechanism 300 of FIG. 3 and the output of RCC mechanism 400 (i.e., link 404) is rigidly connected to a gripper (not shown) that in turn holds a package. If the length of link 404 is less than the length of link 408, then the lines defined by links 402 and 406 will intersect at a point H. Based on the sizes of the gripper and the package to be stacked, lengths of links 402, 404, 406, and 408 can be selected to ensure that point H lies inside the package. When point H lies inside the package, point H will become the kinematic pivot point of the package. In this embodiment, RCC mechanism 400 can be used as a remote center compliance device that passively adjusts the orientation of the package for stacking.

In an alternative embodiment of the RCC mechanism of the present invention, links 402 and 406 may be pivotally connected at points G and G' directly to the input of the gripper and may be pivotally connected at points C and C' directly to the output of X-Y motion mechanism 300 of FIG. 3. In such an embodiment, neither link 404 nor link 408 are required to provide remote center compliance, so long as the distance between points C and C' is greater than the distance between points G and G'.

Figure 1:
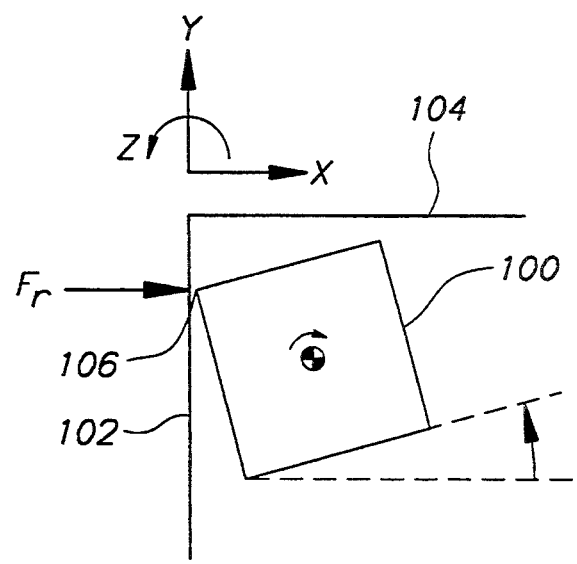
FIGS. 1 and 2 depict two different situations in which a robot must adjust the orientation of a package for proper placement upon a stack.
Figure 2:
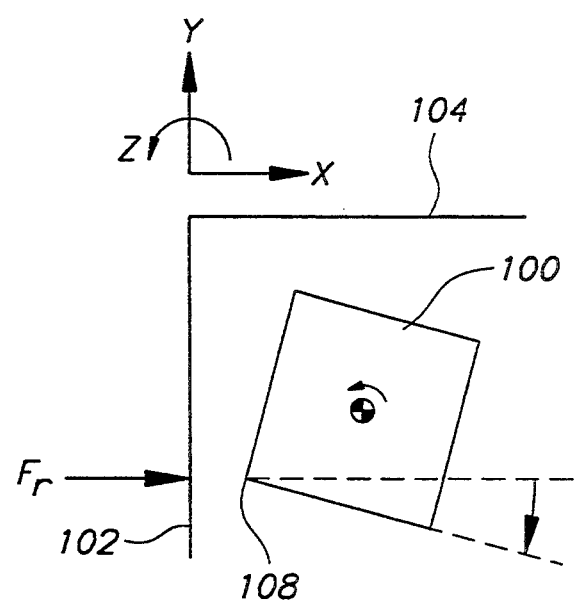

Referring again to FIGS. 1 and 2, a robot that includes RCC mechanism 400 of FIG. 4 will passively adjust the orientation of package 100 for stacking. When, as in FIG. 1, package 100 bumps against wall 102 and force $F_r$ is exerted on package 100 at corner 106, RCC mechanism 400 allows package 100 to rotate clockwise. Similarly, when, as in FIG. 2, package 100 bumps against wall 102 and force $F_r$ is exerted on package 100 at corner 108, RCC mechanism 400 allows package 100 to rotate counter-clockwise. Thus, RCC mechanism 400 can be used to orient a package for stacking without any force sensors or closed-loop control.

Figure 5:
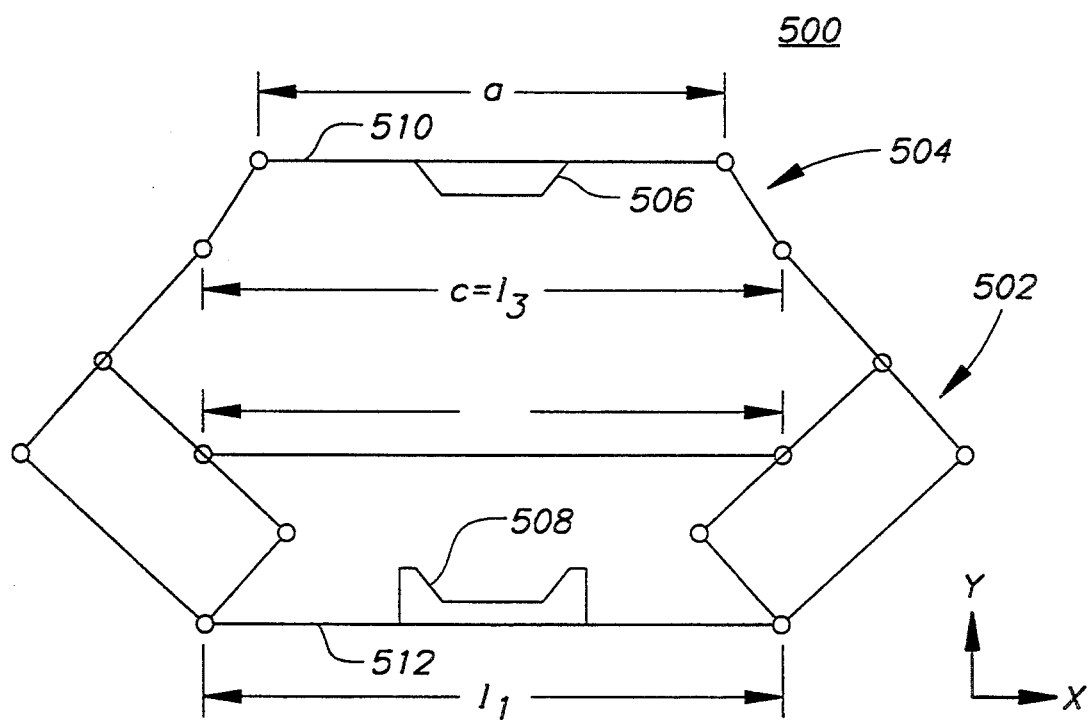
FIG. 5 is a topographical representation of a semi-active compliance device according to a preferred embodiment of the present invention.

Referring now to FIG. 5, there is shown a topographical representation of a semi-active compliance (SAC) device 500 according to a preferred embodiment of the present invention. SAC device 500 includes X-Y motion mechanism 502 and remote center compliance (RCC) mechanism 504. X-Y motion mechanism 502 is substantially similar to X-Y motion mechanism 300 of FIG. 3 and RCC mechanism 504 is substantially similar to RCC mechanism 400 of FIG. 4. In a preferred embodiment, lengths 11, 12, and 13 are all equal to one another.

In addition, SAC device 500 includes male jaw part 506 and female jaw part 508. When the Y-axis actuator (not shown) of X-Y motion mechanism 502 drives the output of SAC device 500 in the negative Y-axis direction (as depicted in FIG. 5), eventually male jaw part 506 and female jaw part 508 will engage. RCC mechanism 504 is a "sloppy" mechanism in that all of its joints are loose pivoting connections. When jaw parts 506 and 508 engage, RCC mechanism 504 is guided by jaw parts 506 and 508 to return to its "home position." RCC mechanism 504 remains locked in its home position until the Y-axis actuator is again driven in the positive Y-axis direction to disengage jaw parts 506 and 508.

In a preferred embodiment, SAC device 500 forms one part of an overall robot system, where the output 510 of SAC device 500 is connected to the input of a gripper (not shown) that grips a package (not shown) to be stacked and the input of SAC device 500 is connected to the output of a mechanical appendage (not shown) that controls the crude position and orientation of the package. The X- and Y-axis actuators (not shown) of X-Y motion mechanism 502 are mounted to the input of SAC device 500. In this preferred embodiment, the package is picked up and moved toward its desired position and orientation by the mechanical appendage with SAC device 500 in its home position.

The home position of SAC device 500 is achieved when X-Y motion mechanism 502 is driven as far in the negative Y-axis direction as possible to engage jaw parts 506 and 508 and lock RCC mechanism 504. As the Y-axis actuator drives output 510 toward the Y-axis home position, jaw part 506 mounted to output 510 and jaw part 508 mounted to link 512 will be forced toward one another in the X-axis direction due to the interlocking shapes of jaw parts 506 and 508. In this way, SAC device 500 is passively returned to the X-axis home position at the center of the X-axis range of X-Y motion mechanism 502.

After the mechanical appendage brings the package to a crude position and orientation (i.e., approaching the stack), the X- and Y-axis actuators of X-Y motion mechanism 502 are driven open-loop with pre-determined allowable forces by using Equations (1) through (4). The walls and/or adjacent stacks will then adjust the fine X- and Y-axis positions of the package. When the Y-axis actuator is driven, jaw parts 506 and 508 disengage and RCC mechanism become free to adjust the Z-axis orientation of the package. By controlling the package forces, the package will be driven into adjacent walls and/or packages in adjacent stacks to position and orient the package for efficient and secure nesting.

The semi-active compliance device of the present invention actively adjusts the fine position of a package using open-loop control and passively adjusts the fine orientation of the package quickly and without the requirement of force control. The SAC device therefore can provide low-cost, high-speed, efficient stacking of packages.

In order to improve the structural integrity of a robot based on the SAC device of the present invention and thereby provide the capability of stacking heavier packages, two SAC devices can be rigidly connected one on top of the other along the Z axis to form a single device.

It will be further understood that various changes in the details, materials, and arrangements of the parts which have been described and illustrated in order to explain the nature of this invention may be made by those skilled in the art without departing from the principle and scope of the invention as expressed in the following claims.

What is claimed is:

1. A semi-active compliance device, attachable to a base, comprising:
   (a) a first linear actuator having a first actuator input adapted to be rigidly fixed to said base and a first actuator output adapted to be aligned along a first axis;
   (b) a second linear actuator having a second actuator input adapted to be rigidly fixed to said base and a second actuator output adapted to be aligned along a second axis, wherein said first axis is substantially perpendicular to said second axis, wherein the first actuator and the second actuator are adapted to be driven independently of each other;
   (c) a first pantograph mechanism, adapted to be substantially co-planar to said first and second axes, pivotally connected to said first actuator output at a first point of said first pantograph mechanism, and pivotally connected to said second actuator output at a second point of said first pantograph mechanism; and
   (d) a second pantograph mechanism, adapted to be substantially co-planar to said first and second axes, pivotally connected to said first actuator output at a first point of said second pantograph mechanism, and pivotally connected to said second actuator output at a second point of said second pantograph mechanism.

2. The device of claim 1, whereby:
   when said first actuator output is driven relative to said first actuator input along said first axis, a first pantograph output of said first pantograph mechanism is driven parallel to said first axis and a second pantograph output of said second pantograph mechanism is driven parallel to said first axis; and
   when said second actuator output is driven relative to said second actuator input along said second axis, said first pantograph output is driven parallel to said second axis and said second pantograph output is driven parallel to said second axis.

3. The device of claim 1, further comprising a remote center compliance device, wherein said remote center compliance device comprises:
   (1) a remote center compliance device output;
   (2) a first rigid link, pivotally connected at a first end to a first pantograph output of said first pantograph mechanism and pivotally connected at a second end to a first end of the remote center compliance device output; and
   (3) a second rigid link, substantially coplanar to said first rigid link, pivotally connected at a first end to said second pantograph output, of said second pantograph mechanism and pivotally connected at a second end to a second end of the remote center compliance device output, wherein the distance between said first end of said first rigid link and said first end of said second rigid link is greater than the distance between said second end of said first rigid link and said second end of said second link.

4. The device of claim 3, further comprising return means for passively returning said remote center compliance device to a home position, wherein said return means comprises:
   (1) a first jaw part rigidly connected to said remote center compliance device output; and
   (2) a second jaw part adapted to be rigidly connected to said base, wherein said first and second jaw parts engage when said second actuator output is driven along said second axis to said home position.

5. The device of claim 3, wherein said remote center compliance device output is adapted to be attached to a gripper for gripping a package and wherein a first line defined by said first rigid link is adapted to approximately intersect a second line defined by said second rigid link at a point inside said package.

6. A semi-active compliance device, for controlling the orientation of a package held by a gripper, comprising:
   (a) a first rigid link, pivotally connected at a first end to a first base and adapted to be pivotally connected at a second end to said gripper;
   (b) a second rigid link, substantially co-planar to said first rigid link, pivotally connected at a first end to said first base, and adapted to be pivotally connected at a second end to said gripper, wherein the distance between said first end of said first rigid link and said first end of said second rigid link is greater than the distance between said second end of said first rigid link and said second end of said second link; and
   (c) an X-Y motion mechanism attachable to a second base, wherein said first base is the output of said X-Y motion mechanism and said X-Y motion mechanism comprises:
      (1) a first linear actuator having a first actuator input adapted to be rigidly fixed to said second base and a first actuator output adapted to be aligned along a first axis;
      (2) a second linear actuator having a second actuator input adapted to be rigidly fixed to said second base and a second actuator output adapted to be aligned along a second axis, wherein said first axis is substantially perpendicular to said second axis;
      (3) a first pantograph mechanism, substantially co-planar to said first and second axes, pivotally connected to said first actuator output at a first point of said first pantograph mechanism, and pivotally connected to said second actuator output at a second point of said first pantograph mechanism, wherein an output of said first pantograph mechanism is pivotally connected to said first base; and
      (4) a second pantograph mechanism, substantially co-planar to said first and second axes, pivotally connected to said first actuator output at a first point of said second pantograph mechanism, and pivotally connected to said second actuator output at a second point of said second pantograph mechanism, wherein an output of said second pantograph mechanism is pivotally connected to said first base.

7. The device of claim 6, whereby:
   when said first actuator output is driven relative to said first actuator input along said first axis, said first pantograph output of said first pantograph mechanism is driven parallel to said first axis and said second pantograph output of said second pantograph mechanism is driven parallel to said first axis; and when said second actuator output is driven relative to said second actuator input along said second axis, said first pantograph output is driven parallel to said second axis and said second pantograph output is driven parallel to said second axis.

8. The device of claim 6, wherein a first line defined by said first rigid link approximately intersects a second line defined by said second rigid link at a point inside said package.

9. A semi-active compliance device, attachable to a base, comprising:
   (a) a first linear actuator having a first actuator input adapted to be rigidly fixed to said base and a first actuator output adapted to be aligned along a first axis;
   (b) a second linear actuator having a second actuator input adapted to be rigidly fixed to said base and a second actuator output adapted to be aligned along a second axis, wherein said first axis is substantially perpendicular to said second axis;
   (c) a first pantograph mechanism, adapted to be substantially co-planar to said first and second axes, pivotally connected to said first actuator output at a first point of said first pantograph mechanism, and pivotally connected to said second actuator output at a second point of said first pantograph mechanism;
   (d) a second pantograph mechanism, adapted to be substantially co-planar to said first and second axes, pivotally connected to said first actuator output at a first point of said second pantograph mechanism, and pivotally connected to said second actuator output at a second point of said second pantograph mechanism; and
   (e) a remote center compliance device, wherein said remote center compliance device comprises:
      (1) a remote center compliance device output;
      (2) a first rigid link, pivotally connected at a first end to said first pantograph output and pivotally connected at a second end to a first end of the remote center compliance device output; and
      (3) a second rigid link, substantially co-planar to said first rigid link, pivotally connected at a first end to said second pantograph output, and pivotally connected at a second end to a second end of the remote center compliance device output, wherein the distance between said first end of said first rigid link and said first end of said second rigid link is greater than the distance between said second end of said first rigid link and said second end of said second link.

10. The device of claim 9, whereby:
when said first actuator output is driven relative to said first actuator input along said first axis, a first pantograph output of said first pantograph mechanism is driven parallel to said first axis and a second pantograph output of said second pantograph mechanism is driven parallel to said first axis; and
when said second actuator output is driven relative to said second actuator input along said second axis, said first pantograph output is driven parallel to said second axis and said second pantograph output is driven parallel to said second axis.

11. The device of claim 9, further comprising return means for passively returning said remote center compliance device to a home position, wherein said return means comprises:
   (1) a first jaw part rigidly connected to said remote center compliance device output; and
   (2) a second jaw part adapted to be rigidly connected to said base, wherein said first and second jaw parts engage when said second actuator output is driven along said second axis to said home position.

12. The device of claim 9, wherein said remote center compliance device output is adapted to be attached to a gripper for gripping a package and wherein a first line defined by said first rigid link is adapted to approximately intersect a second line defined by said second rigid link at a point inside said package.

* * * * *

UNITED STATES PATENT AND TRADEMARK OFFICE
CERTIFICATE OF CORRECTION

PATENT NO. : 5,419,674
DATED : May 30, 1995
INVENTOR(S) : Sun-Lai Chang

It is certified that error appears in the above-indentified patent and that said Letters Patent is hereby corrected as shown below:

Column 7, line 61, delete the first occurrence of "said" and insert therefor -- a --.

Signed and Sealed this

Sixteenth Day of January, 1996

BRUCE LEHMAN

*Attest:*

*Attesting Officer*    Commissioner of Patents and Trademarks